US012724132B2

(12) United States Patent
Xiao et al.

(10) Patent No.: US 12,724,132 B2
(45) Date of Patent: Sep. 1, 2026

(54) LIGHT COVER STAIN DETECTION METHOD AND LIGHT COVER STAIN DETECTION SYSTEM FOR LIDAR

(71) Applicant: Hesai Technology Co., Ltd., Shanghai (CN)

(72) Inventors: Guowei Xiao, Shanghai (CN); Xin Zhao, Shanghai (CN); Qingguo Yu, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 445 days.

(21) Appl. No.: 18/392,334

(22) Filed: Dec. 21, 2023

(65) Prior Publication Data

US 2024/0151830 A1 May 9, 2024

Related U.S. Application Data

(63) Continuation of application No. PCT/CN2022/081304, filed on Mar. 17, 2022.

(30) Foreign Application Priority Data

Jun. 30, 2021 (CN) ......................... 202110734418.5

(51) Int. Cl.
*G01S 7/487* (2006.01)
*G01S 7/497* (2006.01)
*G01S 17/894* (2020.01)

(52) U.S. Cl.
CPC .............. *G01S 7/487* (2013.01); *G01S 7/497* (2013.01); *G01S 17/894* (2020.01); *G01S 2007/4975* (2013.01)

(58) Field of Classification Search
CPC .. G01N 2021/945; G01N 21/94; G01S 17/10; G01S 17/42; G01S 17/89; G01S 17/894;
(Continued)

(56) References Cited

U.S. PATENT DOCUMENTS

2019/0353761 A1 11/2019 Kim et al.
2019/0377072 A1 12/2019 Astrom et al.
(Continued)

FOREIGN PATENT DOCUMENTS

AT 513402 B1 9/2014
CN 109116331 A 1/2019
(Continued)

OTHER PUBLICATIONS

Notice of Preliminary Rejection mailed Dec. 8, 2025, in connection with Korean Patent Application No. 10-2023-7044125, 14 pgs. (including translation).

(Continued)

*Primary Examiner* — Md N Haque
(74) *Attorney, Agent, or Firm* — Chiesa Shahinian & Giantomasi PC; Xuezheng Wang

(57) ABSTRACT

A detection method for stain on a light cover of a LiDAR, including: transmitting a multi-pulse sequence with pulse coding; receiving an echo; obtaining an echo pulse sequence in the echo corresponding to the multi-pulse sequence; determining whether the light cover of the LiDAR has a stain based on a time of flight (TOF) of the echo pulse sequence. The present disclosure utilizes light beams generated by a transmitter unit of the LiDAR to detect a stain on the light cover, without the necessity to add an extra light source and/or detector device. The present disclosure provides a simple structure, which saves internal space of the LiDAR. In this application, the detection is completed by using the coded time, TOF and the number of echo points,
(Continued)

S101
Transmit a multi-pulse sequence with pulse coding

S102
Receive an echo to obtain an echo pulse sequence in the echo corresponding to the multi-pulse sequence S103
Determine whether there is stain on the light cover of the LiDAR based on a TOF of the echo pulse sequence Detection echo
Detection echo
Echo of light cover
Echo of light cover
t1
t and the detection accuracy is high and the misjudgment can be avoided.

17 Claims, 4 Drawing Sheets

(58) Field of Classification Search
CPC ........... G01S 17/931; G01S 2007/4975; G01S 7/4813; G01S 7/487; G01S 7/497; Y02A 90/10
See application file for complete search history.

(56) References Cited

U.S. PATENT DOCUMENTS

| | | | | |
|---|---|---|---|---|
| 2020/0249324 | A1* | 8/2020 | Steinberg | B60S 1/02 |
| 2022/0073035 | A1* | 3/2022 | Onoda | B60S 1/603 |
| 2022/0126792 | A1* | 4/2022 | Totsuka | G01S 17/931 |
| 2022/0268941 | A1* | 8/2022 | Wakamiya | G01S 17/89 |
| 2022/0373651 | A1* | 11/2022 | Novotny | B32B 17/10119 |

FOREIGN PATENT DOCUMENTS

| | | | |
|---|---|---|---|
| CN | 109752379 | A | 5/2019 |
| CN | 111175311 | A | 5/2020 |
| CN | 111551946 | A | 8/2020 |
| CN | 111771136 | A | 10/2020 |
| CN | 111868509 | A | 10/2020 |
| CN | 112099044 | A | 12/2020 |
| CN | 112099045 | A | 12/2020 |
| JP | 2005010094 | A | 1/2005 |
| JP | 2021505893 | A | 2/2021 |
| KR | 20150035204 | A | 4/2015 |
| KR | 20190130920 | A | 11/2019 |
| WO | 2019064062 | A1 | 4/2019 |
| WO | 2020170680 | A1 | 8/2020 |
| WO | 2021065998 | A1 | 4/2021 |

OTHER PUBLICATIONS

Japanese Application No. 2023-580611, JP Office Action dated Aug. 6, 2024.

Extended European Search Report mailed Nov. 8, 2024, in connection with European Patent Application No. 22831252.6, 9 pgs.

Interantional Application No. PCT/CN2022/081304, Interantional Search Report dated May 31, 2022.

Interantional Application No. PCT/CN2022/081304, Written Opinion dated May 31, 2022.

* cited by examiner

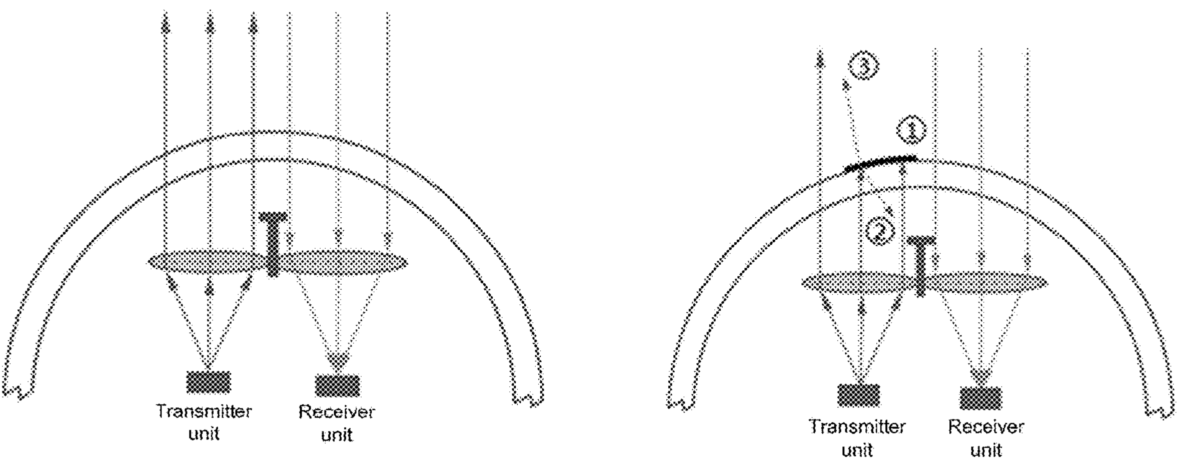
FIG.1A
FIG.1B
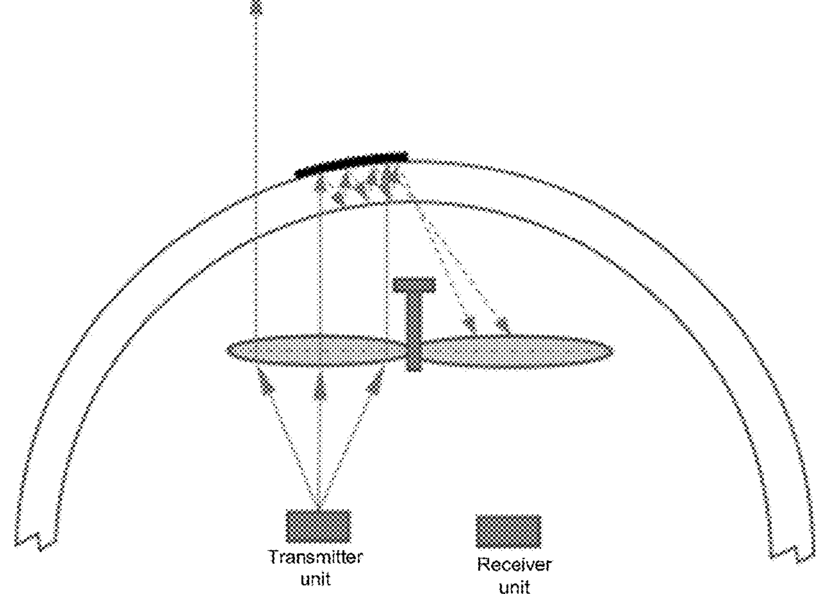
FIG.2

LIGHT COVER STAIN DETECTION METHOD AND LIGHT COVER STAIN DETECTION SYSTEM FOR LIDAR

RELATED APPLICATIONS

The present application claims priority to PCT Application No. PCT/CN2022/081304 filed on Mar. 17, 2022, which claims priority to Chinese Application No. 202110734418.5 filed on Jun. 30, 2021, the contents of which are herein incorporated by reference in their entirety.

TECHNICAL FIELD

This disclosure relates to the field of laser detection, in particular to a detection method for a stain on a light cover of a LiDAR and a detection system for a stain on the light cover of a LiDAR.

BACKGROUND

LiDARs are an important sensor for unmanned driving. An existing LiDAR typically is not provided with a detection means to detect a stain on the light cover. During the traveling process of an unmanned vehicle, the LiDAR may encounter weather conditions such as rain, snow and sandstorms. Accordingly, dust, scratches, sewage, mud stains, corrosion and the like may form on the light cover, leading to the result that the LiDAR cannot obtain environmental information around the unmanned vehicle normally. Therefore, obtaining information of a stain on the light cover of the LiDAR is beneficial for the normal detection of the LiDAR.

In the prior art, a detection method for a stain on the light cover requires arrangement of an additional light transmitting means for detecting a stain on the light cover, so that the structure is relatively complex, the detection accuracy is low, and misjudgment is prone to occur.

The content in the Background merely involves the technology known by the inventors and does not necessarily represent the prior art in the field.

SUMMARY OF THE DISCLOSURE

This disclosure provides a detection method for stain on a light cover of a LiDAR, which is used for improving the accuracy of detecting stain on the light cover and avoid misjudgment.

The detection method includes: S101: transmitting a multi-pulse sequence with a pulse coding;

S102: receiving a LiDAR echo to obtain an echo pulse sequence in the LiDAR echo corresponding to the multi-pulse sequence;

S103: determining whether there is a stain on the light cover of the LiDAR based on a TOF of the echo pulse sequence.

According to an aspect of the present disclosure, the step S103 further includes:

determining that there is a stain on the light cover of the LiDAR when the TOF of the echo pulse sequence is less than a threshold for the TOF.

According to an aspect of the present disclosure, the step S103 further includes:

counting the number of echo points corresponding to the stain on the light cover in a single frame of point cloud data, and determining whether there is a stain on the light cover of the LiDAR based on the number of echo points.

According to an aspect of the present disclosure, the detection method further includes:

determining that there is a stain on the light cover of the LiDAR when the number of echo points is greater than a threshold for the number of points.

According to an aspect of the present disclosure, the detection method further includes:

counting the number of echo points corresponding to the stain on the light cover within a predetermined angle range for detection by the LiDAR, and determining that there is a stain on the light cover within the predetermined angle range when the number of echo points is greater than the threshold for the number of points.

According to an aspect of the present disclosure, the step S101 further includes: transmitting the multi-pulse sequence encoded by a time interval, and the step S102 further includes:

matching a time interval of the echo pulse sequence with the time interval of the multi-pulse sequence.

According to an aspect of the present disclosure, the detection method further includes:

setting a corresponding threshold for the number of points based on the threshold for the TOF.

According to an aspect of the present disclosure, the detection method further includes:

determining that there is a stain on the light cover of the LiDAR when the number of echo points in multiple consecutive frames of point cloud data is greater than the threshold for the number of points.

According to an aspect of the present disclosure, the detection method further includes:

determining a type of the stain on the light cover based on the number of echo points.

According to an aspect of the present disclosure, the detection method further includes:

determining that the stain on the light cover is a reflection type stain when the number of echo points is greater than a first identification threshold;

determining that the stain on the light cover is a scattering type stain when the number of echo points is smaller than or equal to the first identification threshold and greater than a second identification threshold; and determining that the stain on the light cover is an absorption type stain when the number of echo points is smaller than or equal to the second identification threshold.

According to an aspect of the present disclosure, the detection method further includes:

rescanning at a second predetermined angle within the predetermined angle range where the stain on the light cover exists to determine the distribution of the stain on the light cover within the predetermined angle range.

The present disclosure also provides a detection system for a stain on a light cover of a LiDAR, including:

a transmitter unit configured to transmit a multi-pulse sequence with a pulse coding;

a receiver unit configured to receive a LiDAR echo; and a waveform detector unit coupled with the transmitter unit and the receiver unit respectively, and configured to obtain an echo pulse sequence in the LiDAR echo corresponding to the multi-pulse sequence; and a determination unit for stain on the light cover, configured to determine whether there is a stain on the light cover of the LiDAR based on a TOF of the echo pulse sequence.

According to an aspect of the present disclosure, the determination unit for a stain on the light cover is further configured to:

determine that there is a stain on the light cover of the LiDAR when the TOF of the echo pulse sequence is less than a threshold for the TOF.

According to an aspect of the present disclosure, the detection system for a stain on the light cover further includes:

a point counter unit configured to count the number of echo points corresponding to the stain on the light cover in a single frame of point cloud data; and the determination unit for stain on the light cover being further configured to determine whether there is a stain on the light cover of the LiDAR based on the number of echo points.

According to an aspect of the present disclosure, the determination unit for stain on the light cover is further configured to:

determine that there is a stain on the light cover of the LiDAR when the number of echo points is greater than a threshold for the number of points.

According to an aspect of the present disclosure, the point counter unit is further configured to:

count the number of echo points corresponding to the stain on the light cover within a predetermined angle range for detection by the LiDAR; and the determination unit for s stain on the light cover being further configured to determine that there is a stain on the light cover within the predetermined angle range when the number of echo points is greater than the threshold for the number of points.

According to an aspect of the present disclosure, the detection system for a stain on the light cover further includes:

a data acquisition unit coupled between the receiver unit and the waveform detector unit, and configured to perform data acquisition of the LiDAR echo and send a data signal of the LiDAR echo to the waveform detector unit.

According to an aspect of the present disclosure, the transmitter unit is further configured to transmit the multi-pulse sequence encoded by time interval, and the waveform detector unit is further configured to:

match a time interval of the echo pulse sequence with the time interval of the multi-pulse sequence.

According to an aspect of the present disclosure, the determination unit for a stain on the light cover includes a multi-bit storage table configured to:

correspondingly store, in each column of the multi-bit storage table, a determination result of detecting a stain on the light cover within the same predetermined angle range during multiple consecutive frames of scanning of the LiDAR; and correspondingly store, in each row of the multi-bit storage tables, a determination result of a stain on the light cover within each predetermined angle range during single frame of scanning of the LiDAR.

According to an aspect of the present disclosure, the detection system for stain on the light cover is further configured in such a manner that:

when storage results of the same column in the multi-bit storage table all indicate that there is a stain on the light cover in the LiDAR, the determination unit for a stain on the light cover determines that there is a stain on the light cover within the predetermined angle range corresponding to the same column.

This disclosure provides a detection method for a stain on a light cover of a LiDAR and a detection method for a stain on a light cover of a LiDAR, wherein light beams generated by an transmitter unit of the LiDAR are utilized for detecting a stain on the light cover, without the necessity to add an extra light source and/or detector device, and the coded time, the TOF and the number of echo points of the LiDAR are utilized to perform the detection, achieving a high detection accuracy, and avoiding misjudgment, compared to those for detecting stain on the light cover by only setting a threshold in the signal waveform; furthermore, a basis can be provided for subsequently cleaning the stain on the light cover by determining a type of the stain based on the number of echo points. In this disclosure, detection of a stain on the light cover is completed through the transmitter unit and the receiver unit used for detecting a target in the LiDAR, and the structure is simple, saving the internal space of the LiDAR.

BRIEF DESCRIPTION OF THE DRAWINGS

The drawings that constitute part of the specification are provided for further understanding this disclosure, which, along with the embodiments of this disclosure, are used for explaining this disclosure, and do not make any limitation of the same. In the drawings:

FIG. 1A shows an optical path when there is no stain on a light cover of a LiDAR;

FIG. 1B shows an optical path when there is a stain on the light cover of the LiDAR;

FIG. 2 schematically shows an optical path for detecting a stain on the light cover according to one embodiment of this disclosure;

DETAILED DESCRIPTION OF THE EMBODIMENTS OF THE DISCLOSURE

Figure 3:
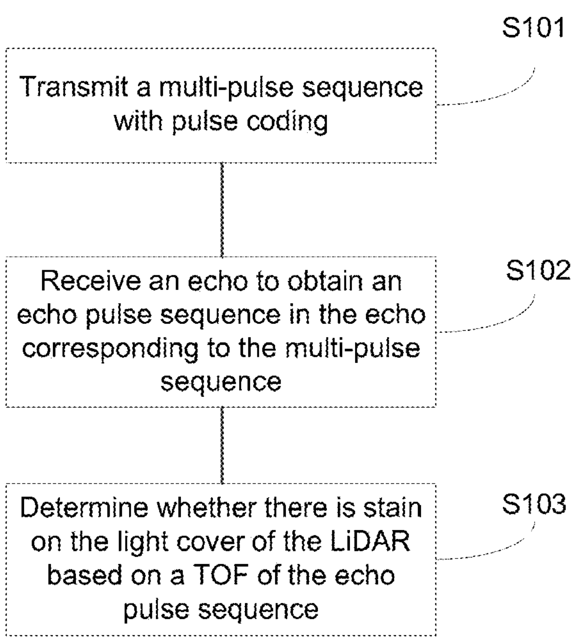
FIG. 3 shows a detection method for a stain on the light cover of the LiDAR according to one preferred embodiment of this disclosure.

In the following, only some example embodiments are briefly described. The described embodiments may be modified in various different ways without departing from the spirit or scope of this disclosure, as would be apparent to those skilled in the art. Accordingly, the drawings and descriptions are to be regarded as illustrative and not restrictive in nature.

In the description of this disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of this disclosure and simplification of the description, instead of indicating or suggesting that the denoted devices or elements must be oriented specifically, or configured or operated in a specific orientation. Thus, such terms should not be construed to limit this disclosure. In addition, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of this disclosure, "plurality" means two or more, unless otherwise defined explicitly and specifically.

In the description of this disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature therebetween, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit this disclosure. Besides, this disclosure may repeat a reference number and/or reference letter in different examples, and such repeat is for the purpose of simplification and clarity, which does not represent any relation among various embodiments and/or arrangements as discussed. In addition, this disclosure provides examples of various specific processes and materials, but those skilled in the art can also be aware of application of other processes and/or use of other materials.

The preferred embodiments of this disclosure will be described below with reference to the drawings. It should be appreciated that the preferred embodiments described here are only for the purpose of illustrating and explaining, instead of limiting, this disclosure.

The light cover of a LiDAR is disposed on the outside the LiDAR to protect the devices inside the LiDAR, and the light cover allows detection beams and echo beams to pass through. Some surface defects or stains often appear on the light cover of the LiDAR, such as oil, sweat, scratches, pits, sewage, dust, and mud. These surface defects or stains can have an adverse impact on the normal detection of the LiDAR.

The stain on the light cover of the LiDAR can be categorized into three types: an absorption type, a reflection type, and a scattering type. The characteristics of these three types of stains can be explained below in detail referring to the drawings. As shown in FIG. 1A, when there is no stain on the light cover of the LiDAR, a transmitter unit transmits detection beams that pass through the light cover of the LiDAR and exit along a straight line. The detection beams exit to a target space and are reflected by a target object to generate detection echoes. The detection echoes are also incident onto a receiver unit of the LiDAR and are received by the receiver unit of the LiDAR, which converts the optical signal into an electrical signal. The distance, speed, reflectivity and other information of the target object are analyzed and obtained by a processor. As shown in FIG. 1B, when there are different types of stains on the light cover of the LiDAR, such as oil, sweat, scratches, pits, sewage, dust, and mud, the detection beams transmitted by the transmitter unit often cannot be emitted in a straight line when encountering the stain on the light cover. Instead, due to the impact of different types of stains, the path where the detection beams exit is changed. For the absorption type stain on the light cover, as shown by point ① in FIG. 1B, there is an absorption type stain at this point on the light cover, such as asphalt, and paint, so that some detection beams are absorbed by the absorption type stain and cannot form emergent beams. For the reflection type stain on the light cover, as shown by point ② in FIG. 1B, there is a reflection type stain at this point on the light cover, such as dust, and soil, so that some detection beams are reflected by the reflection type stain and cannot form emergent beams. For the scattering type stain on the light cover, as shown by point ③ in FIG. 1B, there is a scattering type stain at this point on the light cover, such as scratches, pits, insect corpses, bird droppings, oil, sweat, fingerprints, sewage, clean water, and light cover corrosion, so that some detection beams are scattered by the scattering type stain, and the emergent beams can pass through the scattering type stain, but the propagation direction is changed.

The presence of a stain on the light cover of the LiDAR leads to the results that the detection beams cannot exit or the propagation direction of the detection beams is changed. The impacts on the normal detection of the LiDAR include:

1) a weakened power of the detection beams incident onto the target object, resulting in a decrease in the capability of long-range detection and an increase in the lost points;
2) the decrease in the optical power further resulting in a decrease in the accuracy of reflectivity measurement since the reflectivity of the target object is calculated based on the optical power; and
3) an increase in the noise points caused by the reflection echo from the stain on the light cover.

Therefore, this disclosure provides a detection method for a stain on the light cover of the LiDAR. As shown in FIG. 2, the method utilizes light beams generated by a transmitter unit (e.g., a semiconductor laser) used for detecting a target in the LiDAR to detect a stain on the light cover, without the necessity to add an extra light source to detect the stain on the light cover. The three types of stains mentioned above all reflect detection beams, and the reflection type stain has the highest reflectivity, the absorption type stain has the weakest reflectivity, and the scattering type stain performs partial reflection and has a reflectivity between the two. Therefore, a receiver unit (e.g., an avalanche photodiode, represented by APD, which is merely taken as an example here, the receiver unit adopted in this disclosure not limited to APD) for detecting a target in the LiDAR can be utilized to receive echoes of the detection beams reflected by the stain on the light cover, and convert an optical signal into an electrical signal for further analyzing the position, distribution, and/or type of the stain on the light cover based on waveform information.

As shown in FIG. 3, according to one preferred embodiment of this disclosure, this disclosure provides a detection method 10 for a stain on a light cover of a LiDAR, including steps S101 to S103.

In step S101, transmitting a multi-pulse sequence with a pulse coding.

The LiDAR is used for ranging based on the method of direct time of flight (TOF), namely performing ranging by transmitting a laser pulse with a narrow pulse width and high peak power and measuring the TOF of the laser pulse between the LiDAR and a target object.

Within the same measurement range, a scenario may have multiple LiDARs operate at the same time. For example, multiple LiDARs may be installed in one vehicle, or multiple vehicles installed with LiDAR may be relatively close to each other. Since the measurement principle of LiDAR is to perform measurement based on the TOF of a transmitted laser pulse, if each LiDAR cannot distinguish whether an echo pulse as received is emitted by itself, then there is a certain probability that echo pulses emitted from other LiDARs, when received, will also be determined as echo signals, thereby resulting in an error in the ranging result, and thus causing crosstalk.

At present, adopting the mode of a multi-pulse coding to identify echo signals is an effective anti-interference solution for use in a LiDAR. The basic idea of the pulse coding solution is that the LiDAR emits laser pulses containing predetermined coded information to detect a target object; and performing identification through the predetermined coded information at the time of receiving echoes to determine the reflection echoes of the detection beams emitted by this LiDAR.

A pulse coding can adopt one or more of the coding schemes such as a time interval coding, a peak intensity coding, and a pulse width coding.

In the detection method 10 for a stain on the light cover of the LiDAR, the LiDAR uses a multi-pulse sequence with a pulse coding during detection. There is no necessity to additionally provide a detection light source or adopt a coding mechanism different from the actual detection. Specifically, in the preferred embodiment of this disclosure, it is not necessary to emit coded pulses different from the detection coding in a time sequence to detect a stain, but instead echo pulses are directly adopted to determine the stain on the light cover.

In step S102, receiving a LiDAR echo to obtain an echo pulse sequence in the LiDAR echo corresponding to the multi-pulse sequence.

The stain on the light cover of the LiDAR exists on the surface of the light cover, and the laser reflected by the stain on the light cover is received by the receiver unit. Therefore, whether stains exists on the light cover is detected by detecting whether an echo generated by the stain on the light cover exists in an echo waveform of the receiver unit. In the preferred embodiment of this disclosure, coded information of the transmitted laser pulse is utilized to identify the echo generated by the stain on the light cover, without the necessity to add an extra light source and/or receiving means to detect the stain on the light cover, simplifying the structure and arrangement of the LiDAR.

For example, when the LiDAR uses the coding of a time interval and transmits a plurality of laser pulses containing time coded information, it is determined at the receiving end whether a received pulse signal is an echo generated by the reflection of the plurality of laser pulses based on a time interval of the received pulse signal.

Further, for example, when the LiDAR uses the coding of a peak intensity and transmits a plurality of laser pulses containing peak intensity coded information, it is determined at the receiving end whether a received pulse signal is an echo generated by reflection of the plurality of laser pulses based on a ratio of peak intensities among the received pulse signal (the peak intensity of the received pulse signal may attenuate compared to that of the transmitted pulse, but the ratio is basically unchanged, and a certain tolerance can be set).

Further, for example, when the LiDAR uses the coding of pulse width and transmits a plurality of laser pulses containing pulse width coded information, it is determined at the receiving end whether a received pulse signal is an echo generated by reflection of the plurality of laser pulses based on a ratio of pulse width of the received pulse signal (the pulse width of the received pulse signal may widen compared to that of the transmitted pulse, but the ratio is basically unchanged, and a certain tolerance can be set).

Figure 4:
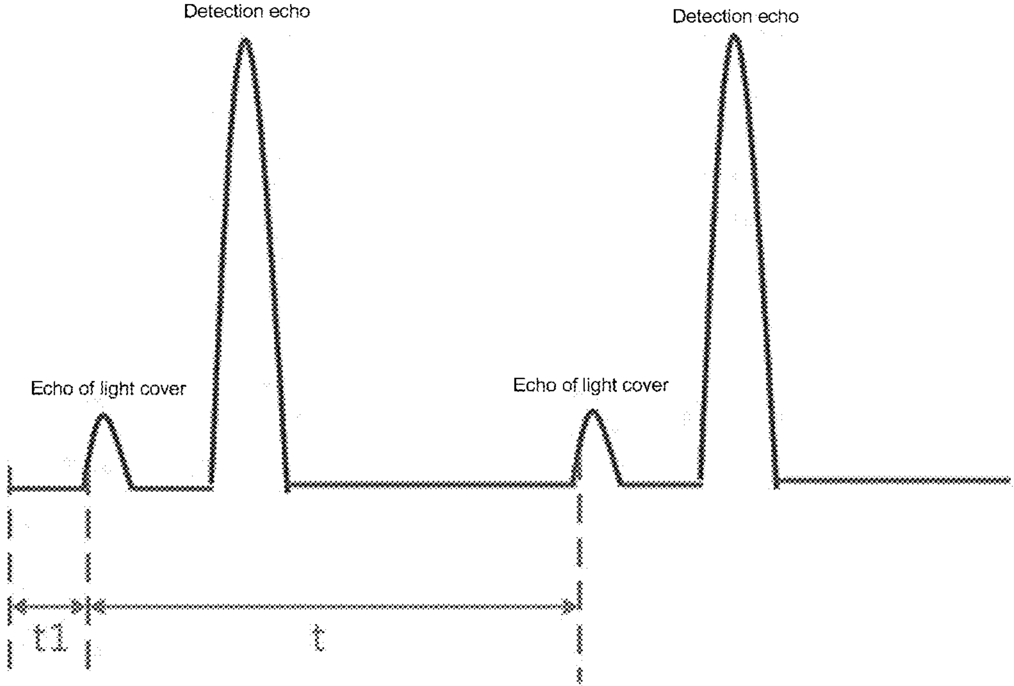
FIG. 4 schematically shows the relative position relationship between an echo pulse sequence corresponding to stain on the light cover and an echo pulse sequence corresponding to a target object.

As shown in FIG. 4, preferably, the transmitter unit of the LiDAR uses the coding of time interval. For example, if the transmitter unit transmits a dual-pulse sequence with a time interval coding t, the waveform of echoes generated by the stain on the light cover and echoes reflected by a target object when detection beams scan the target space is shown in FIG. 4. There is a time interval t between the two light cover echoes, and there is also a time interval t between the two detection echoes.

First, echo pulse sequences corresponding to the detection beams are determined based on the coding of a time interval, and then an echo pulse sequence generated by the stain on the light cover is screened from the echo pulse sequences. The feature of a light cover echo is to form one small pulse respectively before a plurality of normal echo pulses, and the time interval between two adjacent small pulses is equal to the time interval between two adjacent normal echoes, which is the coded time.

In step S103, determining whether there is a stain on the light cover of the LiDAR based on the TOF of the echo pulse sequence.

Due to the very close distance between the light cover and the transmitter unit, the TOF of the echo pulse sequence corresponding to the stain on the light cover is very short, and then whether an echo pulse sequence corresponds to the stain on the light cover can be determined based on the set TOF corresponding to this echo pulse sequence. Preferably, the TOF of this echo pulse sequence is determined based on the leading edge time of the first pulse in this echo pulse sequence. As shown in FIG. 4, preferably, if the transmitter unit transmits a dual-pulse sequence with a time interval coding t, then there are two conditions for determining an echo pulse sequence corresponding to the stain on the light cover in a single detection:

1) if two echo signals meet the coding condition, that is, the coded time of the transmitted pulse sequence is t, then the interval between the leading edge time of two adjacent echo signals corresponding the stain on the light cover is also t; and
2) the leading edge time of the first pulse in the echo pulse sequence corresponding to the stain on the light cover is less than t1, for example, t1 is 1 ns. The leading edge time t1 can be in a certain value range, and the value of t1 can be determined by the detection precision requirement and the type of the LiDAR (the distance between the light cover and the transmitter unit).

The function of condition 1) is to screen out an echo pulse sequence that meets the coding condition; and the function of condition 2) is that since the echo of a short-range target is similar to the echo corresponding to the stain on the light cover, this may cause a false alarm. To minimize the probability of the false alarm, the characteristic that echoes from different distances have different leading edge time can be utilized. For example, the false alarm caused by the echo of the short-range target may be filtered out by setting a TOF threshold (e.g., setting the leading edge time of the echo pulse sequence to be less than 1 ns).

Based on the detection method for a stain on the light cover provided in the preferred embodiment of this disclosure, there is no necessity to add an extra means or structure to the LiDAR, and the coding scheme adopted in the actual detection of the LiDAR is utilized for detection, and the detection accuracy is high.

According to one preferred embodiment of this disclosure, in the detection method 10, the step S103 (determining whether there is a stain on the light cover of the LiDAR based on the TOF of the echo pulse sequence) further includes:

counting a number of echo points corresponding to the stain on the light cover in a single frame of point cloud data, and determining whether there is a stain on the light cover of the LiDAR based on the number of echo points. The number of echo points refers to the number of points corresponding to echoes in the LiDAR's point cloud.

Taking a mechanical LiDAR as an example, its opto-mechanical rotor typically includes a plurality of lasers, each laser transmitting light in a direction corresponding to one field of view or one angle in the vertical direction. The opto-mechanical rotor rotates about a vertical axis to achieve 360-degree scanning and detection in the horizontal direction, and form a frame of point cloud data for the LiDAR. Regarding one of the lasers, during the rotation process, it transmits a detection beam once every certain rotation angle (i.e., the angular resolution of the LiDAR, e.g., 0.1 degree), and the receiver unit of the LiDAR receives the echo of this detection beam after diffuse reflection on an obstacle and generates a point cloud data. After scanning one round, the LiDAR generates a frame of point cloud data, which includes information about the obstacle in the surrounding environment of the current position of the LiDAR.

For example, regarding a 128-line LiDAR, in the case of all lasers transmitting light, assuming that an angular resolution is 0.1°, a frame of point cloud data with 460800 points is generated within one detection cycle.

According to one preferred embodiment of this disclosure, the detection method 10 further includes: determining that there is a stain on the light cover of the LiDAR when the number of echo points is greater than a threshold for the number of points.

In a preferred embodiment of this disclosure, in addition to the condition of determining a stain on the light cover by the TOF, the restrictive condition of counting the number of echo points corresponding to a stain on the light cover in a single frame of point cloud data is added. For example, regarding a 128-line LiDAR, in the case of all lasers transmitting light, assuming that an angular resolution is 0.1°, a frame of point cloud data with 460800 points is generated within one detection cycle. When more than 100 points therein meet the condition of the threshold for the TOF, it is considered that there is a stain on the light cover.

A preferred embodiment of this disclosure uses a threshold for the number of points set in a single frame of point cloud data, so that it is determined that there is a stain on the light cover when the number of points corresponding to the stain on the light cover is greater than the threshold for the number of points. On the basis of screening through the TOF threshold in the previous embodiment, the determination condition of the threshold for the number of points is added to avoid misjudgment caused by various interference factors, making the determination result more accurate.

According to one preferred embodiment of this disclosure, the detection method 10 further includes:

counting the number of echo points corresponding to the stain on the light cover within a predetermined angle range for detection by the LiDAR, and determining that there is a stain on the light cover within the predetermined angle range when the number of echo points is greater than the threshold for the number of points.

The stain on the light cover of the LiDAR typically may not be distributed in various positions of the light cover, but concentrated within a certain angle range. Therefore, a specific angle range can be set. For example, by taking every 10° as an interval, the total number of echo points corresponding to stain on the light cover within a range of every 10° is calculated, and a threshold for the number of points is set, so that it is determined that there is a stain on the light cover within a range of 10° when the total number of echo points corresponding to the stain on the light cover within the range of 10° is greater than the threshold for the number of points.

For example, regarding a 128-line LiDAR, with all lasers transmitting light, assuming that an angular resolution is 0.1°, the LiDAR generates point cloud data with a total of 12800 points within a scanning range of 10°. If the threshold for the number of points is set such that if there are 5 points, out of 12800 points, being the echo points corresponding to a stain on the light cover, then it is considered that there is a stain on the light cover. Moreover, the multi-line LiDAR can also allow some lasers to transmit light or adopt other angular resolutions.

On the basis of adding the threshold for the number of points in the previous embodiment, this embodiment limits the range of a stain on the light cover to a predetermined angle range, which not only can accurately determine whether there is a stain on the light cover, but also can predict the range of the stain, facilitating the subsequent work of cleaning up the stain.

According to one preferred embodiment of this disclosure, the step S101 in the detection method 10 further includes: transmitting a multi-pulse sequence coded by a time interval, and the step S102 further includes:

matching the time interval of the echo pulse sequence with the time interval of the multi-pulse sequence.

According to one preferred embodiment of this disclosure, the transmitter unit of the LiDAR preferably uses the coding of a time interval to transmit a multi-pulse sequence.

By sampling with an analog to digital converter (ADC), the full wave waveform of the LiDAR echo can be obtained. By setting a threshold for the intensity, a plurality of echo pulse signals with the peak intensity higher than the threshold for the intensity are screened out of the LiDAR echo. When the time interval of the plurality of echo pulse signals as screened matches the time interval of the transmitted pulse sequence, the screened echo pulse signals are taken as one echo pulse sequence corresponding to the transmitted pulse sequence.

According to one preferred embodiment of this disclosure, in the detection method 10, the step S103 (determining whether there is a stain on the light cover of the LiDAR based on the TOF of the echo pulse sequence) further includes:

determining that there is a stain on the light cover of the LiDAR when the TOF of the echo pulse sequence is less than a threshold for the TOF.

Returning to FIG. 4, due to the very short distance between the light cover and the transmitter unit of the LiDAR, if there is stain on the light cover, the TOF of a detection beam from emission by the transmitter unit to reception by the receiver unit after reflection by the stain on the light cover is also very short, much shorter than the TOF when the detection beam is received by the receiver unit after being reflected by an obstacle. The TOF of the echo pulse sequence can be determined by the leading edge time of the first echo pulse in the echo pulse sequence, or the TOF of the echo pulse sequence can be further determined by converting the peak time of the first echo pulse in the echo pulse sequence or other time points in the echo pulse sequence. These all fall within the scope of protection of this disclosure. When the TOF of an echo pulse sequence is less than the threshold for the TOF, it is determined that this echo pulse sequence is the echo pulse signal generated after the detection beam is reflected by a stain on the light cover and received by the receiver unit. And, it is determined that there is a stain on the light cover in the LiDAR.

In the process where a target object, which is initially close to the light cover (0 cm), gradually moves away from the light cover, the number of echo points corresponding to a stain on the light cover detected in a single frame undergoes a process of increasing at first and then decreasing. When the target object is about 5 cm away from the light cover, the number of echo points detected is even greater than that when there is a stain on the surface of the light cover. Therefore, by solely utilizing the threshold for the TOF, it is not possible to fully prevent a false alarm caused by a short-range target.

Detailed explanation will be made below regarding how to prevent a false alarm caused by a short-range target.

Figure 5A:
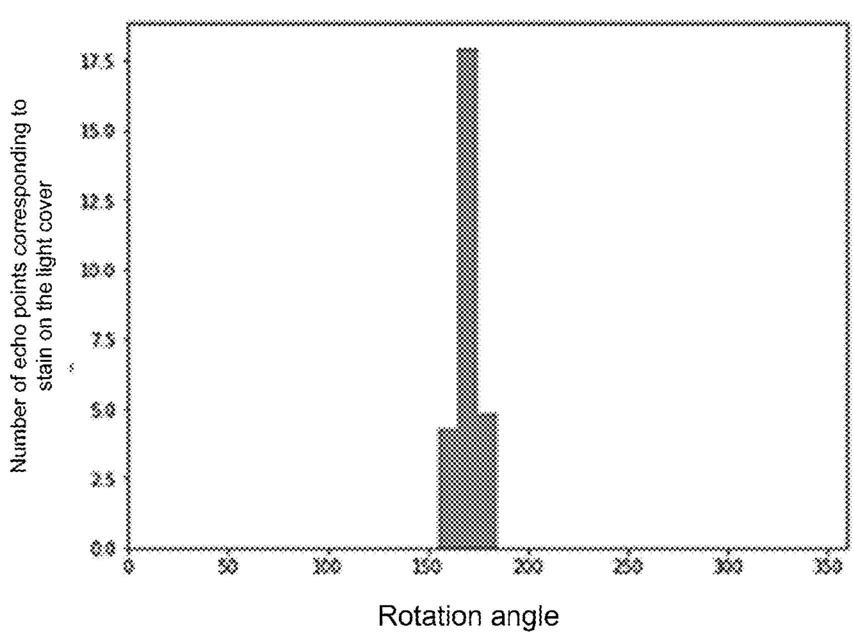
FIG. 5A shows the number of echo points corresponding to the stain on the light cover in a single frame of point cloud data when a threshold for the TOF is 1 ns.
Figure 5B:
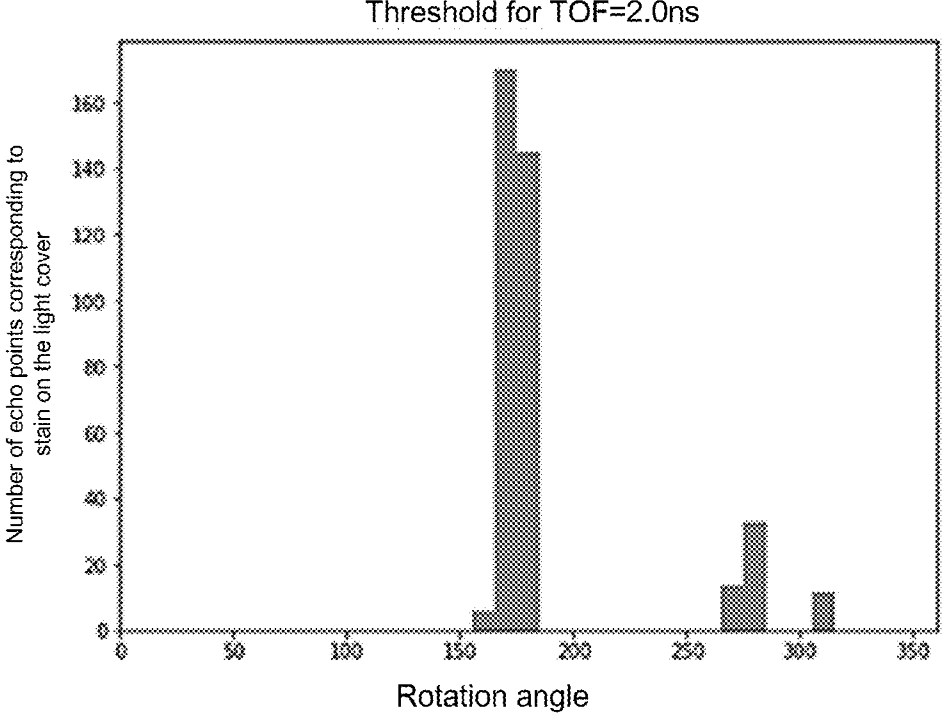
FIG. 5B shows the number of echo points corresponding to the stain on the light cover in a single frame of point cloud data when a threshold for the TOF is 2 ns.

According to one preferred embodiment of this disclosure, the detection method 10 further includes: setting a corresponding threshold for the number of points based on the threshold for the TOF. Then different thresholds for the TOF correspond to different thresholds for the number of points, so that a stain on the light cover can be accurately determined by utilizing the threshold for the TOF and its corresponding threshold for the number of points, avoiding a false alarm caused by a short-range target. As shown in FIGS. 5A and 5B, FIG. 5A shows the number of echo points corresponding to each angle in a single frame of point cloud data when the threshold for the TOF is set to be 1 ns. FIG. 5B shows the number of echo points corresponding to each angle in a single frame of point cloud data when the threshold for the TOF is set to be 2 ns. From FIG. 5A and FIG. 5B, it can be known that when the threshold for the TOF is increased, the number of echo points corresponding to the stain on the light cover detected increases. Increasing the threshold for the TOF has effective detection influence for a stain on the light cover in a relatively large range (e.g., stain on the light cover at an oblique angle), but may also increase the false alarm rate.

As shown in FIG. 5A, when the threshold for the TOF is 1 ns, a corresponding threshold D1 for the number of points can be set, and whether the number of echo points corresponding to the stain on the light cover in the single frame of point cloud data exceeds this threshold for the number of points can be determined by calculation. As shown in FIG. 5B, when the threshold for the TOF is 2 ns, a corresponding threshold D2 for the number of points can be set, and whether the number of echo points corresponding to the stain on the light cover in the single frame of point cloud data exceeds this threshold for the number of points can be determined by calculation. The threshold for the number of points when the TOF is 2 ns is higher than the threshold for the number of points when the TOF is 1 ns.

Preferably, the number of echo points corresponding to the stain on the light cover within a predetermined angle range is calculated. As shown in FIG. 5A, when the threshold for the TOF is 1 ns, a corresponding threshold for the number of points within a range of 10° can be set (e.g., to be 5 points), and whether the number of echo points generated within the range of 10° and corresponding to the stain on the light cover in the point cloud data exceeds this threshold of 5 for the number of points can be determined by calculation. As shown in FIG. 5B, when the threshold for the TOF is 2 ns, a corresponding threshold for the number of points within a range of 10° can be set (e.g., to be 40 points), and whether the number of echo points generated within the range of 10° and corresponding to the stain on the light cover in the point cloud data exceeds this threshold of 40 for the number of points can be determined by calculation.

In this embodiment, the threshold for the TOF is combined with the threshold for the number of points to avoid a false alarm caused by a short-range target. In a practical operation, a lookup table can be set to dynamically select a threshold for the TOF and a corresponding threshold for the number of points, and a threshold adjustment can also be made based on actual detection situations to reduce false alarms.

Given that stain on the light cover can exist stably, while a short-range target object may exist for a very short period of time (e.g., a moving target), the false alarm caused by the short-range target can be reduced further by setting the limit of the number of frames. For example, if the numbers of echo points corresponding to the stain on the light cover in 10 consecutive frames in the case of the same threshold for the TOF all reaches the threshold for the number of points, it is then considered that the stain on the light cover is detected. According to one preferred embodiment of this disclosure, the detection method 10 further includes:

determining that there is a stain on the light cover of the LiDAR when the number of echo points in multiple consecutive frames of point cloud data is greater than the threshold for the number of points.

According to one preferred embodiment of this disclosure, the detection method 10 further includes determining a type of the stain on the light cover based on the number of echo points.

Returning to FIG. 1B, regarding the absorption type stain at the position of 0, its corresponding reflection echo is very weak, and the number of echo points as generated corresponding to the stain on the light cover can be smaller.

Regarding the reflection type stain at the position of 0, its corresponding reflection echo is stronger, and the number of echo points as generated corresponding to the stain on the light cover is greater. Regarding the scattering type stain at the position of 0, its corresponding reflection echo is relatively weak, and the number of echo points as generated corresponding to the stain on the light cover is smaller compared to that corresponding to the reflection type stain, and greater compared to that corresponding to the absorption type stain. The number of echo points corresponding to the stain on the light cover is of statistical significance, and an identification threshold can be set for the number of echo points to determine the stain type.

According to one preferred embodiment of this disclosure, the detection method 10 further includes:

determining that the stain on the light cover is a reflection type stain when the number of echo points is greater than a first identification threshold. The reflection type stain includes, mud, dust, soil, etc.

Determining that the stain on the light cover is a scattering type stain when the number of echo points is smaller than or equal to the first identification threshold and greater than a second identification threshold. The scattering type stain includes sewage, scratches, pits, insect corpses, bird droppings, oil, sweat, fingerprints, clean water, light cover corrosion, etc.

Determining that the stain on the light cover is an absorption type stain when the number of echo points is smaller than or equal to the second identification threshold. The absorption type stain includes oil, sweat, asphalt, paint, etc.

Determination of the type of the stain on the light cover by the number of echo points is a preparation for the next step of cleaning up the stain.

According to one preferred embodiment of this disclosure, the detection method 10 further includes:

rescanning at a second predetermined angle within a predetermined angle range where the stain exists on the light cover to determine the distribution of stain on the light cover within the predetermined angle range.

According to one preferred embodiment of this disclosure, for example, a 128-line LiDAR is adopted, with an angular resolution of 0.1°, and all lasers transmitting light. There are a total of 12800 points within a predetermined range of 10°, and the threshold for the number of points is set to be 5. If there are more than 5 echo points corresponding to a stain on the light cover within the predetermined range of 10°, it is determined that there is a stain on the light cover within this range of 10°. Preferably, when the numbers of echo points corresponding to a stain on the light cover within the range of 10° in ten consecutive frames are all greater than 5, it is determined that there is stain on the light cover within this range of 10°. After determining the specific angle range where the stain on the light cover is, the LiDAR can adopt the original angular resolution to rescan within this angle range and subdivide this specific angle range into a plurality of predetermined angles. For example, this range of 10° is subdivided into ten angle ranges of 1°. Within every predetermined angle range of 1°, the number of echo points corresponding to the stain on the light cover is counted, thus determining the specific position and thickness distribution of the stain on the light cover. The LiDAR can also adopt other angular resolutions to rescan within this angle range. These all fall within the scope of protection of this disclosure. The number of echo points corresponding to the stain on the light cover is determined based on a coding match and the threshold for the TOF, which will not be repeated here.

Figure 6:
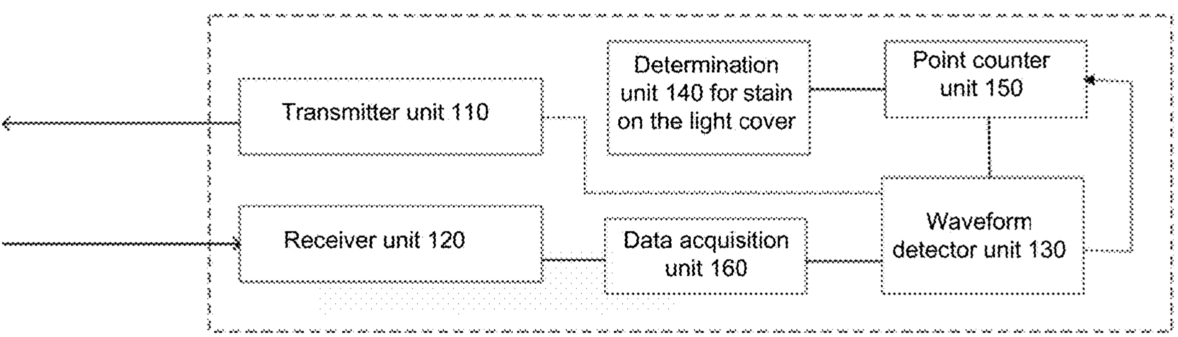
FIG. 6 schematically shows a detection system for a stain on the light cover according to one preferred embodiment of this disclosure.

As shown in FIG. 6, according to one preferred embodiment of this disclosure, this disclosure further provides a detection system 100 for stain on the light cover of a LiDAR, including a transmitter unit 110, a receiver unit 120, a waveform detector unit 130, and a determination unit 140 for a stain on the light cover.

The transmitter unit 110 is configured to transmit a multi-pulse sequence with a pulse coding. The coded laser pulses commonly used by a LiDAR in detection are used. There is no necessity to additionally provide a detection light source or adopt a coding scheme different from an actual detection.

The receiver unit 120 is configured to receive a LiDAR echo.

The waveform detector unit 130 is coupled with the transmitter unit 110 and the receiver unit 120 respectively, and is configured to:

obtain an echo pulse sequence in the LiDAR echo corresponding to the multi-pulse sequence. The waveform detector unit is used to generate waveform information, including pulse width, peak intensity, leading edge time, distance, angle, and other information, and to obtain a corresponding echo pulse sequence by matching with the coding of the transmitted pulse sequence.

The determination unit 140 for stain on the light cover is configured to determine whether there is a stain on the light cover of the LiDAR based on the TOF of the echo pulse sequence. The echo pulse sequence corresponding to the stain on the light cover is different from the echo pulse sequence of the detection beam. Due to the very close distance between the light cover and the transmitter unit, the TOF of the echo corresponding to the stain on the light cover is very short, and then whether an echo pulse sequence corresponds to the stain on the light cover can be determined based on the correspondingly set TOF of the echo pulse sequence.

As shown in FIG. 6, according to one preferred embodiment of this disclosure, the detection system 100 for stain on the light cover further includes a point counter unit 150, the point counter unit 150 configured to count the number of echo points corresponding to a stain on the light cover in a single frame of point cloud data; and the determination unit 140 for a stain on the light cover is further configured to determine whether there is a stain on the light cover of the LiDAR based on the number of echo points.

The LiDAR generates a frame of point cloud data every scanning cycle, where the point counter unit 150 counts the number of echo points corresponding to the stain on the light cover in the single frame of point cloud data, and the determination unit 140 for a stain on the light cover determines whether there is a stain on the light cover of the LiDAR based on this number of echo points.

According to one preferred embodiment of this disclosure, in the detection system 100 for a stain on the light cover, the determination unit 140 for a stain on the light cover is further configured to:

determine that there is a stain on the light cover of the LiDAR when the number of echo points is greater than a threshold for the number of points.

In the process of forming a single frame of point cloud by a LiDAR, specifically regarding a 128-line LiDAR, with all lasers transmitting light, assuming that an angular resolution is 0.1°, the threshold for number of points in a single frame means that it is considered that a stain on the light cover exists when the number of echo points in 460800 points satisfying the condition of TOF exceeds the threshold for the number of points.

A preferred embodiment of this disclosure uses the threshold for the number of points in a single frame of point cloud data, so that it is determined that there is a stain on the light cover when the number of points corresponding to the stain on the light cover is greater than the threshold for the number of points, avoiding a false alarm caused by a short-range target (e.g., a fly accidentally flying over the LiDAR's light cover).

According to one preferred embodiment of this disclosure, in the detection system 100 for a stain on the light cover, the point counter unit 150 is further configured to count the number of echo points corresponding to the stain on the light cover within a predetermined angle range for detection by the LiDAR; and the determination unit 140 for stain on the light cover is further configured to determine that there is a stain on the light cover within the predetermined angle range when the number of echo points is greater than the threshold for the number of points.

The stain on the light cover of the LiDAR usually may not be distributed in various positions of the light cover, but concentrated within a certain angle range. Therefore, a specific angle range can be set. For example, by taking every 10° as an interval, the total number of echo points of the light cover within a range of every 10° is calculated, and a threshold for the number of points is set, so that it is determined that there is a stain on the light cover within a range of 10° when the total number of echo points of the light cover within the range of 10° is greater than the threshold for the number of points.

For example, regarding a 128-line LiDAR with all lasers transmitting light, assuming that an angular resolution is 0.1°, a threshold for the number of points is set, which means that it is considered that stain on the light cover exists when there are 5 points, out of 12800 points, being the echo points corresponding to the stain on the light cover.

This embodiment not only avoids a false alarm about an echo of the light cover caused by a short-range target, but also limits the range of a stain on the light cover to the predetermined angle range, facilitating the subsequent work of cleaning up the stain.

According to one preferred embodiment of this disclosure, as shown in FIG. 6, the detection system 100 for a stain on the light cover further includes:

- a data acquisition unit 160 coupled between the receiver unit 120 and the waveform detector unit 130, and configured to perform data acquisition of the LiDAR echo and send a data signal of the LiDAR echo to the waveform detector unit 140. The data acquisition unit 160 can include an analog-to-digital converter (ADC) or a time-to-digital converter (TDC).

According to one preferred embodiment of this disclosure, the transmitter unit 110 in the detection system 100 for a stain on the light cover is further configured to transmit a multi-pulse sequence coded by a time interval, and the waveform detector unit 130 is further configured to:

- match the time interval of the echo pulse sequence with the time interval of the multi-pulse sequence.

According to one preferred embodiment of this disclosure, the determination unit 140 for a stain on the light cover in the detection system 100 for a stain on the light cover is further configured to:

- determine that there is a stain on the light cover of the LiDAR when the TOF of the echo pulse sequence is less than a threshold for the TOF. When the TOF of the echo pulse sequence is less than the threshold for the TOF, it is determined that this echo pulse sequence is the echo signal generated after the detection beam is reflected by a stain on the light cover and received by the receiver unit 110. And, it is determined that there is a stain on the light cover in the LiDAR.

The threshold for the TOF and the threshold for the number of points can be combined for use, and the corresponding threshold for the number of points can be set based on the threshold for the TOF.

Figure 7:
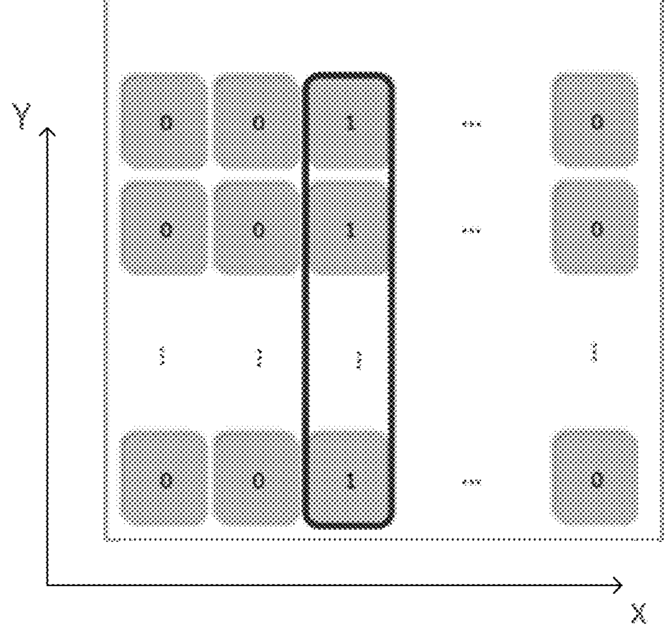
FIG. 7 schematically shows a two-dimensional storage table of a determination unit for a stain on the light cover according to one preferred embodiment of this disclosure.

As shown in FIG. 7, according to one preferred embodiment of this disclosure, in the detection system 100 for a stain on the light cover, the determination unit 140 for a stain on the light cover includes a multi-bit storage table configured to:

- correspondingly store, in each column of the multi-bit storage table, a determination result of detecting a stain on the light cover within the same predetermined angle range during multiple consecutive frames of scanning of the LiDAR; and
- correspondingly store, in each row of the multi-bit storage tables, a determination result of a stain on the light cover within each predetermined angle range during single frame of scanning of the LiDAR.

Preferably, as shown in FIG. 7, one 36-bit binary number memory is used, with each column representing one angle range in its length direction (as the X direction shown in the figure), such as 0 to 10°, 10° to 20° . . . 350° to 360°; and each row representing one frame in its width direction (as the Y direction shown in the figure). In the 1st row in the width direction, which represents the 1st round(360°) of scanning by the LiDAR, the number of echo points corresponding to a stain on the light cover is counted once by the point counter unit within every range of 10°. The bit in the memory is stored as 1 when this number of echo points is greater than the threshold for the number of points. When the storage values of the same column of multiple consecutive rows are all 1, this reflects that the number of echo points corresponding to a stain on the light cover within this predetermined angle range for multiple consecutive frames is greater than the threshold for the number of points.

According to one preferred embodiment of this disclosure, when storage results of the same column in the multi-bit storage table all indicate that there is a stain on the light cover of the LiDAR, the determination unit 140 for a stain on the light cover determines that there is a stain on the light cover within the predetermined angle range corresponding to the same column.

Preferably, when the storage results of the same multiple columns of multiple consecutive rows in the multi-bit binary memory all indicate that there is a stain on the light cover, it is determined that there is a stain on the light cover at an average value of the maximum predetermined angle range and the minimum predetermined angle range corresponding to the same multiple columns.

After determining the angle range of the stain on the light cover, the detection system 100 for a stain on the light cover rescans at a second predetermined angle within the angle range corresponding to the stain on the light cover to determine the distribution of the stain on the light cover within the predetermined angle range.

The transmitter unit involved above includes at least one of the following semiconductor lasers: a vertical-cavity surface-emitting laser (VCSEL); and an edge transmitting laser (EEL). The receiver unit involved above includes at least one of the following detectors: a single photon avalanche diode (SPAD) detector; an avalanche photo diode (APD) detector; and a silicon photomultiplier (SiPM) detector.

A preferred embodiment of this disclosure provides a detection method for a stain on the light cover of the LiDAR and a detection system for a stain on the light cover of the LiDAR. Light beams generated by a transmitter unit of the LiDAR are utilized for detecting stain on the light cover, without the necessity to add an extra light source and/or detector device, and the coded time, the TOF, and the number of echo points of the LiDAR are utilized to perform the detection, achieving a high detection accuracy, and avoiding misjudgment. In a preferred embodiment of this disclosure, detection for a stain on the light cover is completed through the transmitter unit and the receiver unit used for detecting a target in the LiDAR. The structure is simple, saving the internal space of the LiDAR. According to a preferred embodiment of this disclosure, the type and distribution of a stain on the light cover can be determined through the number of echo points, which provide a basis for subsequently cleaning the stain on the light cover.

Last but not least, it should be explained that described above are just preferred embodiments of this disclosure, which are not used to limit this disclosure. Although the detailed description of this disclosure has been provided with reference to the foregoing embodiments, those skilled in the art can still make modifications to the technical solution as recited in each of the foregoing embodiments, or conduct equivalent replacement of some technical features therein. Any modification, equivalent replacement, or improvement, if falling into the spirit and principles as stated herein, should be included in the scope of protection of this disclosure.

We claim:

1. A detection method for detecting a stain on a light cover of a LIDAR, comprising:

transmitting a multi-pulse sequence with a pulse coding;

receiving a LiDAR echo;

obtaining an echo pulse sequence in the LiDAR echo corresponding to the multi-pulse sequence; and determining whether the light cover of the LiDAR has a stain based on a time of flight (TOF) of the echo pulse sequence, wherein the determining whether the light cover has a stain further comprises:

counting a number of echo points corresponding to the stain on the light cover in a single frame of point cloud data;

determining whether the light cover has a stain based on the number of the echo points; and determining that the light cover has a stain when the number of the echo points is greater than a point threshold for the number of the echo points.

2. The detection method of claim 1, wherein the determining whether the light cover has a stain further comprises:

determining that the light cover has a stain when the TOF of the echo pulse sequence is less than a TOF threshold for the TOF.

3. The detection method of claim 1, further comprising:

counting the number of the echo points corresponding to the stain on the light cover within a predetermined angle range, and determining that the light cover has a stain within the predetermined angle range when the number of echo points is greater than the point threshold for the number of the echo points.

4. The detection method of claim 1, wherein the transmitting the multi-pulse sequence further comprises: transmitting the multi-pulse sequence encoded by a time interval, and the obtaining the echo pulse sequence further comprises:

matching a time interval of the echo pulse sequence with the time interval of the multi-pulse sequence.

5. The detection method of claim 1, further comprising:

setting a corresponding point threshold for the number of the echo points based on the TOF threshold for the TOF.

6. The detection method of claim 1, further comprising:

determining that the light cover has a stain when the number of the echo points in multiple consecutive frames of point cloud data is greater than the point threshold for the number of the echo points.

7. The detection method of claim 1, further comprising: determining a type of the stain on the light cover based on the number of the echo points.

8. The detection method of claim 7, further comprising:

determining that the stain on the light cover includes a reflection type stain when the number of the echo points is greater than a first identification threshold;

determining that the stain on the light cover includes a scattering type stain when the number of echo points is smaller than or equal to the first identification threshold and greater than a second identification threshold; and determining that the stain on the light cover includes an absorption type stain when the number of echo points is smaller than or equal to the second identification threshold.

9. The detection method of claim 3, further comprising:

rescanning at a second predetermined angle within the predetermined angle range where the stain on the light cover is determined to determine the distribution of the stain on the light cover within the predetermined angle range.

10. A detection system for a stain on a light cover of a LiDAR, comprising:

a transmitter configured to transmit a multi-pulse sequence with a pulse coding;

a receiver configured to receive a LiDAR echo; and a waveform detector coupled with the transmitter and the receiver, respectively, and configured to obtain an echo pulse sequence in the LiDAR echo corresponding to the multi-pulse sequence;

a determination unit coupled with the waveform detector and configured to receive information about the echo pulse sequence and determine whether the light cover of the LiDAR has a stain based on a time of flight (TOF) of the echo pulse sequence; and a counter configured to count a number of echo points corresponding to the stain on the light cover within a predetermined angle range, wherein the determination unit is further configured to determine that the light cover has a stain within the predetermined angle range when the number of echo points is greater than the point threshold for the number of the echo points.

11. The detection system of claim 10, wherein the determination unit is further configured to:

determine that the light cover of the LiDAR has a stain when the TOF of the echo pulse sequence is less than a TOF threshold for the TOF.

12. The detection system of claim 10, wherein the determination unit is further configured to:

determine that the light cover of the LiDAR has a stain when the number of echo points is greater than a point threshold for the number of the echo points.

13. The detection system of claim 12, wherein the counter is further configured to:

count the number of echo points corresponding to the stain on the light cover within a predetermined angle range; and the determination unit being further configured to determine that the light cover has a stain within the predetermined angle range when the number of echo points is greater than the point threshold for the number of the echo points.

14. The detection system of claim 10, further comprising:

a data acquisition unit coupled between the receiver and the waveform detector, and configured to perform data acquisition of the LiDAR echo and send a data signal of the LiDAR echo to the waveform detector.

15. The detection system of claim 10, wherein the transmitter is further configured to transmit the multi-pulse sequence encoded by a time interval, and the waveform detector is further configured to:

match a time interval of the echo pulse sequence with the time interval of the multi-pulse sequence.

16. The detection system of claim 13, wherein the determination unit comprises a multi-bit storage table configured to:

correspondingly store, in each column of the multi-bit storage table, a determination result of detecting the stain on the light cover within the same predetermined angle range during multiple consecutive frames of scanning of the LiDAR; and correspondingly store, in each row of the multi-bit storage tables, a determination result of detecting the stain on the light cover within each predetermined angle range during single frame of scanning of the LiDAR.

17. The detection system claim 16, further configured in such a manner that:

when storage results of the same column in the multi-bit storage table all indicate that the light cover in the LiDAR has a stain, the determination unit determines that the light cover has the stain within the predetermined angle range corresponding to the same column.

* * * * *